E. H. FISHER.
SPRING WHEEL.
APPLICATION FILED FEB. 17, 1912.
1,053,166.
Patented Feb. 18, 1913.
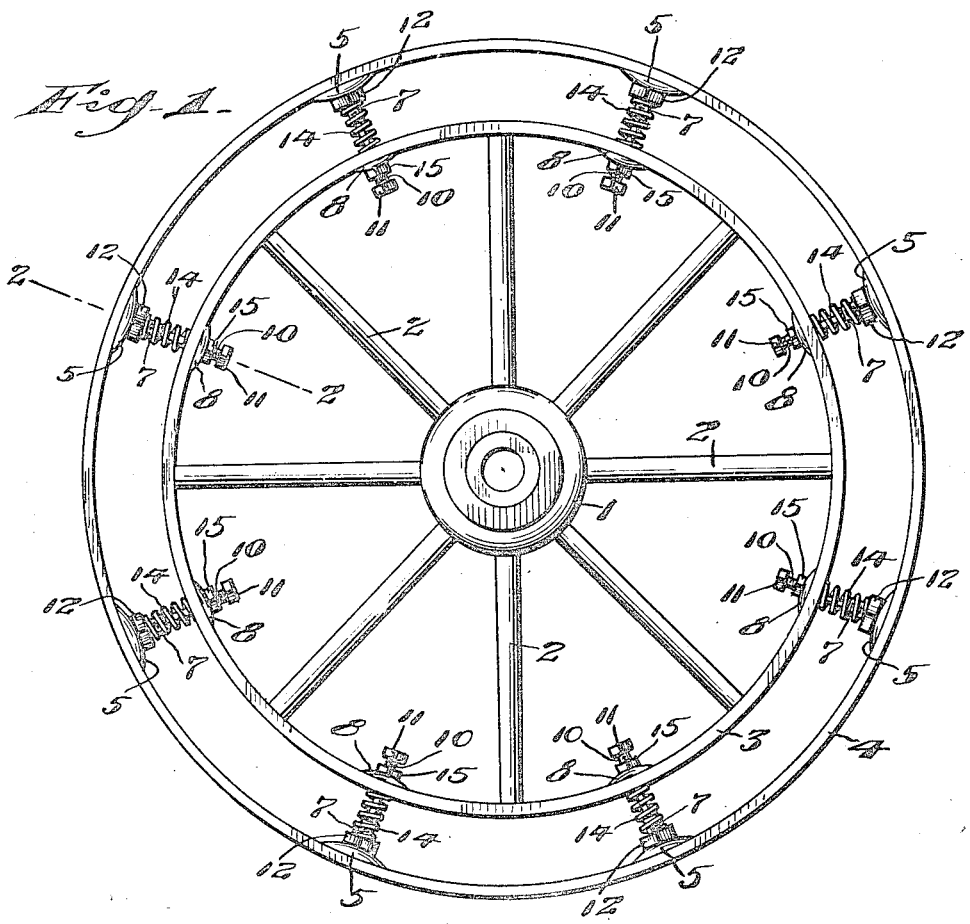
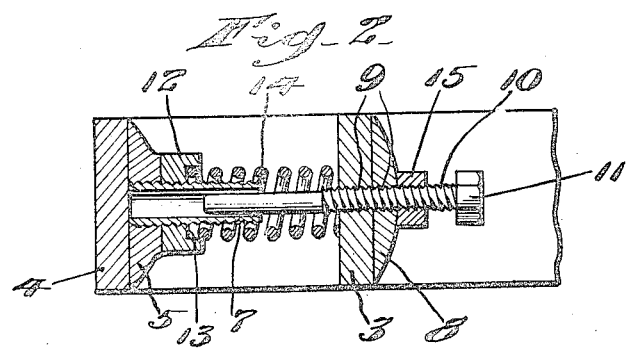

UNITED STATES PATENT OFFICE.

ERNST HENRY FISHER, OF PHILADELPHIA, PENNSYLVANIA.

SPRING-WHEEL.

1,053,166.  Specification of Letters Patent.  Patented Feb. 18, 1913.

Application filed February 17, 1912. Serial No. 678,189.

*To all whom it may concern:*

Be it known that I, ERNST H. FISHER, a subject of the Emperor of Germany, residing at Philadelphia, in the county of Philadelphia and State of Pennsylvania, have invented certain new and useful Improvements in Spring-Wheels, of which the following is a specification.

My invention relates to improvements in spring wheels, the object of the invention being to provide a metal wheel which will elastically support its load and dispense altogether with pneumatic tires.

A further object is to provide an improved spring wheel in which the tension of the springs may be adjusted in accordance with the load and the elasticity desired.

With these and other objects in view, the invention consists in certain novel features of construction and combinations and arrangements of parts, as will be more fully hereinafter described and pointed out in the chaim.

In the accompanying drawings: Figure 1, is a view in side elevation illustrating my improvements, and Fig. 2, is a view in section on an enlarged scale on the line 2—2 of Fig. 1.

1, represents a wheel hub which is connected by a series of spokes 2 with a metal ring 3, and around the ring 3 is a larger metal ring 4 which is concentric with the ring 3 and is of appreciably greater diameter than the ring 3. The ring 4 constitutes the tire to contact with the ground, while the ring 3 constitutes the rim of the wheel, and for convenience of description, I shall hereinafter refer to the part 3 as the rim and the part 4 as the tire.

Tire 4, at regular intervals, on its inner face, is provided with enlargements 5 into which externally screw-threaded tubes 7 are secured by brazing or otherwise to have a strong fixed relationship with the tire.

The wheel rim 3, at regular intervals on its inner face, is provided with enlargements 8, and these enlargements and the rim are made with screw-threaded openings 9 to receive threaded bolts 10 having heads 11 on their inner ends. These bolts 10 may be screw-threaded throughout a portion of their length as shown, and they are long enough to project into the tubes 7, and are of a diameter appreciably less than the internal diameter of the tubes to allow the rim and tire the necessary amount of independent movement.

When the bolts are adjusted, they may be securely locked by means of jam nuts 15. Nuts 12 are screwed onto the tubes 7, and have recesses 13 in their inner faces to house the outer ends of coiled springs 14 which are positioned around tubes 7 and bolts 10, and bear at their outer ends against the nuts 12 and at their inner ends against the rim 3. The springs, therefore, elastically hold the tire 4 spaced from the rim 3, and a weight on the hub of the wheel in sustaining the load of the vehicle, tends to contract these springs adjacent the ground, so that they will elastically support the load at all times. The tension of the springs 14 may be adjusted by turning the nuts 12, so that the strength and elasticity of the spring wheel may be adjusted in accordance with the load it sustains.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A spring wheel comprising two concentric flat rings forming a tire and a rim respectively, externally screw-threaded tubes secured in the outer ring or tire, bolts screwed through the inner ring or rim, integral heads on the inner ends of said bolts, lock nuts on said bolts, said tubes of an appreciable internal diameter greater than the bolts and receiving the outwardly projecting ends of the bolts, nuts on the tubes having recessed inner faces and coiled springs positioned around the tubes and bolts and bearing at their inner ends against the rim and at their outer ends in the recesses in the last-mentioned nuts, whereby the movements of the nuts on the tubes adjust the tension of the springs, substantially as described.

In testimony whereof I have signed my name to this specification in the presence of two subscribing witnesses.

ERNST HENRY FISHER.

Witnesses:
CHARLES E. POTTS,
R. H. KRENKEL.